(12) United States Patent
Mastie

(10) Patent No.: US 6,480,866 B2
(45) Date of Patent: *Nov. 12, 2002

(54) METHOD AND APPARATUS TO FACILITATE CREATION OF DOCUMENTS FROM INDIVIDUAL PAGES

(75) Inventor: Scott David Mastie, Longmont, CO (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,990

(22) Filed: Jun. 30, 1998

(65) Prior Publication Data

US 2001/0011288 A1 Aug. 2, 2001

(51) Int. Cl.$^7$ .......................... G06F 17/21; G06F 17/24; G06F 15/00
(52) U.S. Cl. .................. 707/525; 707/511; 707/517
(58) Field of Search ................ 707/517, 525, 707/511; 345/435; 358/1.15, 1.12; 382/112

(56) References Cited

U.S. PATENT DOCUMENTS

| | | | | |
|---|---|---|---|---|
| 5,271,065 A | * | 12/1993 | Rourke et al. | 382/112 |
| 5,619,649 A | * | 4/1997 | Kovnat et al. | 358/1.15 |
| 5,625,766 A | * | 4/1997 | Kauffman | 345/435 |
| 5,890,177 A | * | 3/1999 | Moody et al. | 707/511 |
| 5,963,968 A | * | 10/1999 | Warmus et al. | 707/517 |
| 5,995,719 A | * | 11/1999 | Bourdead'hui et al. | 358/1.12 |
| 6,064,397 A | * | 5/2000 | Herregods et al. | 345/435 |
| 6,088,710 A | * | 7/2000 | Dreyer et al. | 707/517 |
| 6,134,018 A | * | 10/2000 | Dziesietnik et al. | 358/1.15 |

OTHER PUBLICATIONS

Backlund, Bjorn E., OOE: A Compound Document Framework, Jan. 1997, downloaded from url <http://www.acm.org/sigchi/bulletin/1997.1/backlund.html>, downloaded on Apr. 24, 2002, pp. 1–17.*

Lan, M., Panos, R.M., Printing press configuration–a knowledge–based approach, IEEE Expert, vol. 5, Issue 1, pp. 65–73, Feb. 1990.*

* cited by examiner

Primary Examiner—Joseph H. Feild
Assistant Examiner—William L. Bashore
(74) Attorney, Agent, or Firm—David W. Victor; Konrad Raynes Victor & Mann LLP

(57) ABSTRACT

A method and apparatus of assembling a set of page files into a document file is described. A set of page files, which represents one page or a group of pages within a document, is received as input files. For one embodiment of the present invention, the page files and document files are written in a page description language. The correct sequence of the pages within the document is determined. Then, a framework for a document file is created. The framework is created to include all or a portion of the pages from the set of page files. One or more of the pages within the page files are modified to fit into the framework and then stored within the document framework. The document file is then stored.

30 Claims, 5 Drawing Sheets

METHOD AND APPARATUS TO FACILITATE CREATION OF DOCUMENTS FROM INDIVIDUAL PAGES

CROSS-REFERENCE TO RELATED COPENDING PATENT APPLICATIONS

The following patent applications which are assigned to the assignee of the present invention cover subject matter related to the subject matter of the present invention: "Method and Apparatus of Creating Highly Portable Output files," having application Ser. No. 09/107,333; and "Method and Apparatus for Improving Page Description Language (PDL) Efficiency by Recognition and Removal of Redundant Constructs", having application Ser. No. 09/107,543; all are assigned to International Business Machines Corporation by Scott Mastie, et al. and all are filed concurrently herewith.

BACKGROUND OF THE INVENTION

1. Field of the Invention

The present invention relates to a method and apparatus for processing multiple files, and more specifically, to assembling a set of input files into one output file.

2. Description of Related Art

Printing refers to the reproduction of words and pictures on a page or document. Today, the high volume production machines of the major printing processes are the presses, which use plates (or other types of image carriers) to transfer the ink onto the paper or substrate. These processes are often used to support markets such as commercial printing, magazines, newspapers, catalogs, books, business forms, greeting cards, maps, labels, packaging, and other printed products.

One common type of production printing process is the offset printing process which uses an intermediate blanket cylinder to transfer an image from the image carrier to the substrate. In general, printing operations include, prepress operations, press operations, and postpress operations. The offset printing process, and in particular its prepress operations, involve intricate manual operations which are very time consuming and cost intensive, and require highly skilled expensive professionals.

FIG. 1 illustrates a flowchart for an offset printing process. The first four steps 100, 110, 120, and 130 represent the prepress operations 140 of an offset printing process. The first step 100 involves the layout and preparation of the materials to be used in the production printing. For example, checking for the desired size and other details for illustration, and the arrangement into the proper position of various parts of the page to be photographed. At this stage, the raw pages may provide input into a camera or other imaging device.

Next in step 110, the imaging operation is performed. During the imaging operation images for reproduction are collected, created and/or corrected prior to assembly for platemaking. Photography may be used to make the images for the plates. When using photography, the individual films must be properly prepared before they can be assembled to make the plates. Digital cameras and digital scanners and software may also be used to produce digital files for making the plates.

Then in step 120, the imaging assembly operation assembles all of the image elements to create pages and signature forms for printing. Note that generally books and other publications are printed in units of a number of pages per sheet called signatures. There may be from two to sixty-four pages on each side of the sheet, depending on the size of the page, the signature, the form to be printed, and the press. Thus, if there are 1600 pages for a particular book to be printed and there are 16 pages per signature, then 100 offset plates (i.e., each offset plate produces a particular signature) are required to print the entire book. The offset plates provide the input to the offset printing press. The assembly process ensures that when the sheet is printed, folded and trimmed, the pages will appear in the proper sequence.

The last step 130 in the prepress operations represents the actual platemaking (or image carrier) process. Today, many platemaking processes are available.

Once all the prepress operations are completed, the offset printing press is used to print multiple copies of several different sheets. As stated above, each offset plate is used to produce one signature, which represents a collection of individual pages after it has been folded, slit, trimmed, etc. When using an offset printing press, each offset plate must be input into the press. Once an offset plate is inserted into the press, multiple copies of one particular sheet are printed. Each sheet represents a printed copy of multiple pages and may be single-sided (simplex) or double-sided (duplex). Note that each sheet is eventually folded, slit, trimmed, etc. to create a copy of the individual pages within the signature. The offset printing process repeats this process (i.e., inserting an offset plate and printing multiple copies of a sheet) until all offset plates have been used as input into the offset press. Thus, a book or publication is typically made up of many individual signatures, which are like sections in a book, which are combined in the desired order to form a book. Where appropriate for the proper sequence of pages, blank pages are manually or programmatically added to the book or publication.

Once all the sheets have been printed, the printed sheets are combined into a single document having multiple pages (i.e., books, catalogs, magazines, pamphlets, or other publications). The postpress operations shown in box 160 include operations such as binding, finishing and distribution.

Although the offset press printing process, and other printing processes that use plates are cost effective when printing high volumes of documents, it is often not practical for printing smaller volumes. For printing press systems, the unit cost of prints decrease as the quantities increase. Thus, printing press systems typically require several thousands of copies of a document to be printed in order to be profitable.

With the development of digital image processing, digital printing systems may be used to improve the productivity, quality, and efficiency of many printing operations. Many digital printing systems use a plateless printing process. Common plateless digital printing processes include electrophotography, ink-jet, and thermal transfer, etc. Digital printing systems are often desirable over printing press processes because (1) most of the equipment are suitable for an office environment (2) its capabilities of variable printing from impression-to-impression; and (3) requires less manual skills than printing on conventional plate presses.

Under certain circumstances, it is particularly advantageous to use a digital printing system to produce documents. For example, it is more cost effective to print a small volume of documents (e.g., books, catalogs, magazines, etc.) with a digital printing system rather than an offset printing press, particularly when printing on-demand or when the document contains a large number of loose leaf pages.

One conventional digital printing system reproduces a multiple-page document by printing multiple jobs. Each print job includes one or more electronically stored print files. Each print file may be used to reproduce a single loose leaf page (also referred to as a "folio" page) in a multiple page document such as a book. Or alternatively, the various print files in a particular document may be combined manually using a "job ticket" or similar construct to create a single print job to reproduce a multiple-page document. Typically, a job ticket is used to define the print attributes for a print job. A print job is generally assembled and created by a data processing system (e.g., a client computer or a workstation) and submitted to a digital printing system, or alternatively assembled and created by a highly sophisticated printing system.

When these types of digital printing processes are used to reproduce documents, blank pages must be added. Furthermore, the print time for multiple print jobs is typically longer than the print time for a single print job for reproducing a multiple-page document, particularly a voluminous document. Additionally, as the document gets larger (i.e., increase in number of pages) the likelihood that the pages may get out of order increases. Furthermore, when multiple print files are used to reproduce a multiple page document, it is more cumbersome to store, back-up, recover, or print the multiple print files as compared to a single print file.

As the printing industry transitions from conventional printing press operations to digital printing operations to take advantage of the technological advances made in digital imaging, it is possible to provide a more automated printing process. One approach to providing a more automated digital printing process is to store, back-up, recover, and print a multiple-page document as a single object.

SUMMARY OF THE INVENTION

It is an object of the present invention to assemble a collection of individual files into a single file.

A method and apparatus of assembling a set of page files into a document file is described. A set of page files, which represents one page or a group of pages within a document, is received as input files. For one embodiment of the present invention, the page files and document files are written in a page description language. The correct sequence of the pages within the document is determined. Then, a framework for a document file is created. The framework is created to include all or a portion of the pages from the set of page files. One or more of the pages within the page files are modified to fit into the framework and then stored within the document framework. The document file is then stored.

One aspect of the present invention includes creating one or more blank pages within the document framework.

An additional aspect includes removing document constructs in one or more of the page files that do not define the page file as being a page within the document framework.

Another aspect includes adding document constructs in one or more of the page files that are necessary to define the page file as being a page within the document framework.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

When printing multiple-page documents (e.g., books, magazines, catalogs, or various other publications) on a digital printing system, one or more print jobs are submitted to the digital printing system as input. Each print job is comprised of one or more electronically-stored files and the print attributes, which inform the printer how to process the print files. Print jobs are typically assembled by a data processing system (e.g., a workstation, desktop computer, or other similar system) and then submitted to a digital printing system or other output device via a network (e.g., a local area network (LAN)) or alternatively, stored on a removable storage medium (e.g., cd-rom, floppy disk, etc.) which is then used as input into a digital printing system, other output device, or a post-processing device.

The present invention provides a method and apparatus for combining a set of page files, in the correct page order to form a single document file (also referred to as a digital book). For one embodiment of the present invention, the document file represents a total of "M" pages and each of the page files represent a single page or a grouping of "n" pages, where $1<n<M$. It should be noted that for one embodiment of the present invention, "M" pages may represent all pages within the document. Furthermore, any necessary blanks may be added to the document file. By combining the set of page files in this manner to create a digital book, the assembled book can be submitted to a digital printing system or other output device as a single print job. Examples of digital printing systems includes the IBM InfoPrint family of printers and various PostScript® printers. PostScript is a registered trademark of Adobe Systems. Alternatively, the digital book in the form of a single document file may be stored, backed-up, and recovered, etc. as a single object. This leads to printing and processing operations that are substantially more automated than production press operations.

For one embodiment of the present invention, the set of page files represent a set of PostScript page files which are to be assembled into a single PostScript document file. For alternative embodiments, some page description language (PDL) other than PostScript or some non-PDL programming language may be used to define the pages within the page and document files. The PostScript page files are assembled into a PostScript document file (i.e., the digital book), and then stored as an output file. For one embodiment of the present invention, the output file contains the entire contents of the digital book. As stated above, the output file may then be sent to a digital printing system or other output device as a print job for printing, or stored on a removable storage medium (e.g., cd-rom, floppy disk, etc.).

Figure 1:
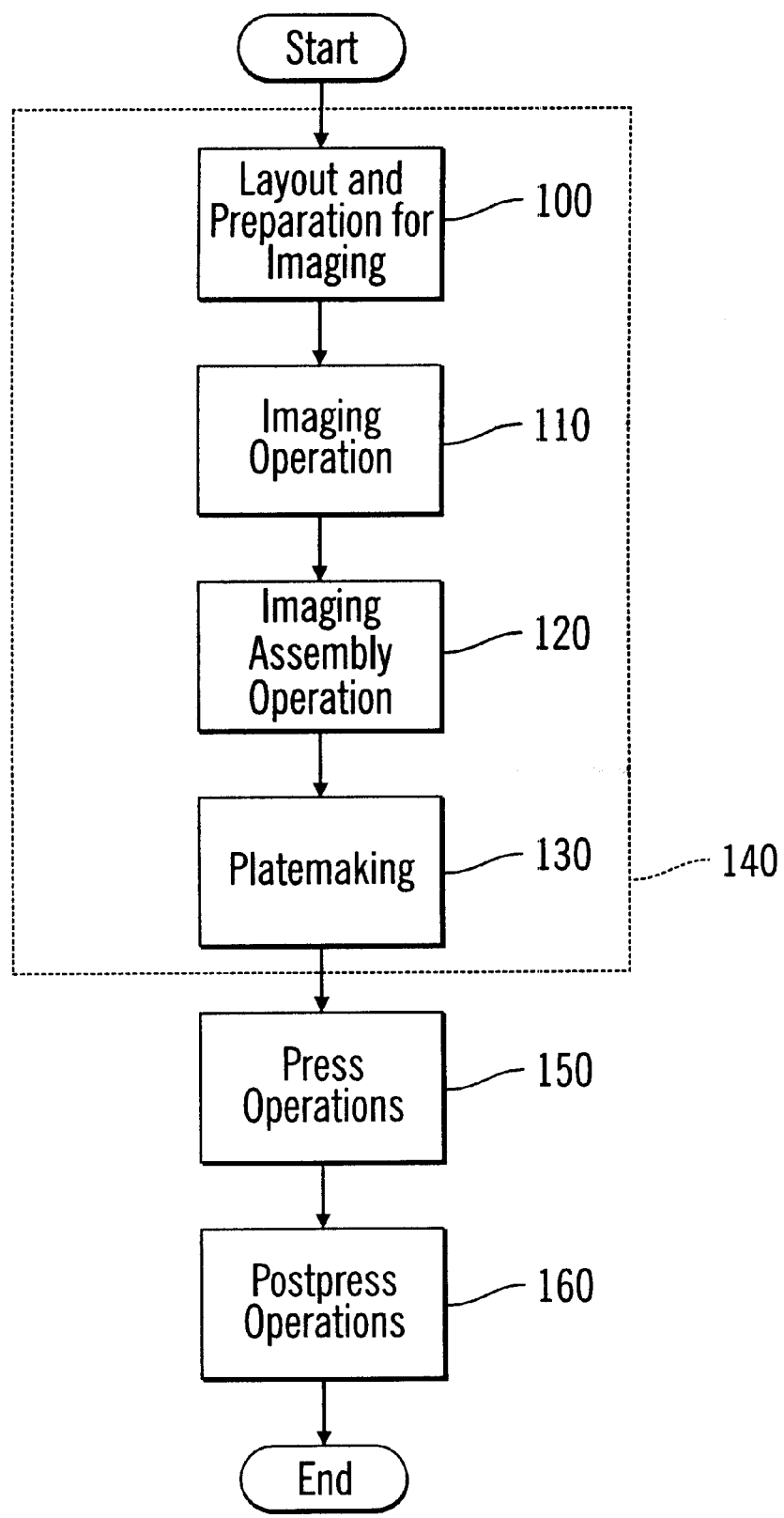
FIG. 1 illustrates a conventional offset printing process.
Figure 2:
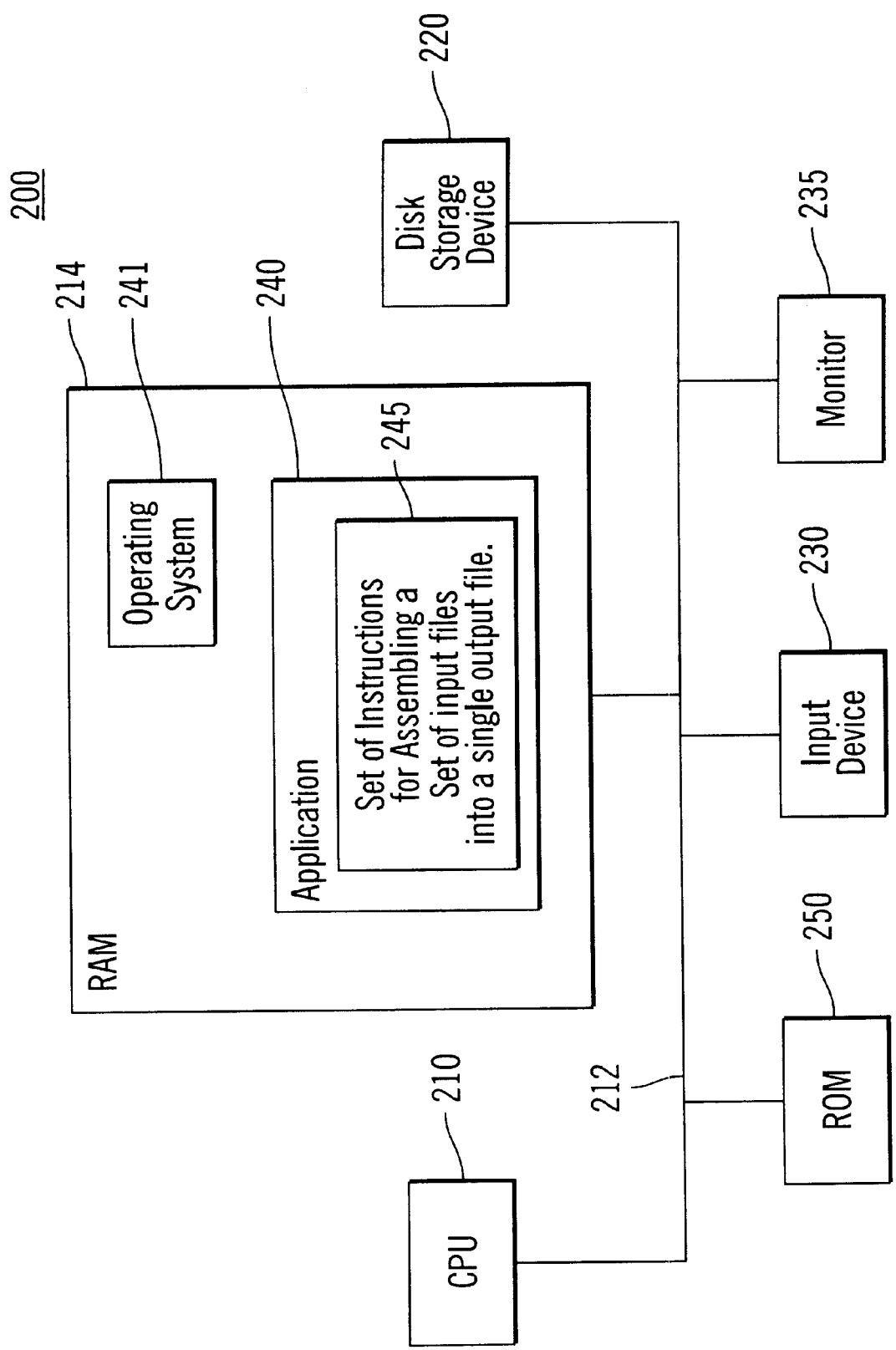
FIG. 2 illustrates one embodiment of data processing system for implementing the present invention.

FIG. 2 illustrates a data processing system 200 for assembling a set of page files into a document file in accordance with one embodiment of the present invention. In general, the data processing system receives a digital document for processing. The files of the digital document are then prepared for printing or further processing by using one or more application programs. After any changes are made to the files, the document is then sent as a single print job to a digital printing system or other output device, or stored on some storage device. It is within the scope of the present invention for data processing system 200 to consist of a workstation, server, personal computer system, set top box, or any other device that may create a highly portable output file.

A central processing unit (CPU) 210, such as one of the PC microprocessors available from International Business Machines Corp., is provided for processing data and executing instructions. The CPU 210 is interconnected to various other components by a system bus 212.

An operating system 241 runs on CPU 210, provides control and is used to coordinate the function of the various components shown in FIG. 2. Operating system 241 may be one of the commercially available operating systems. An application program 240, which includes a set of instructions 142 for assembling a set of input files into a single output file (to be subsequently described in detail), runs in conjunction with operation system 241 which implements the various functions to be performed by application program 240.

Also shown in FIG. 2, application program 240 includes a set of instructions 245 for assembling a set of input files into a single output file, according to one embodiment of the present invention, as is described in more detail below. In alternative embodiments, the set of instructions for assembling a set of input files into a single output file could be stored in memory exclusive of application program 240, or alternatively, could be implemented in hardware circuitry or firmware (e.g., read-only-memory).

Random access memory (RAM) 214 is coupled to system bus 212. The software components (e.g., operating system 241 and application program 240) are loaded into RAM 214, which operates as the data processing system's main memory.

Also coupled to system bus 212 is an input device 230 for entering data into system 200, a monitor 235 for displaying data, a disk storage device 220 for storing data and instructions, and a read only memory (ROM) 250 for controlling the basic computer functions (e.g., basic input/output system (BIOS)).

Figure 3:
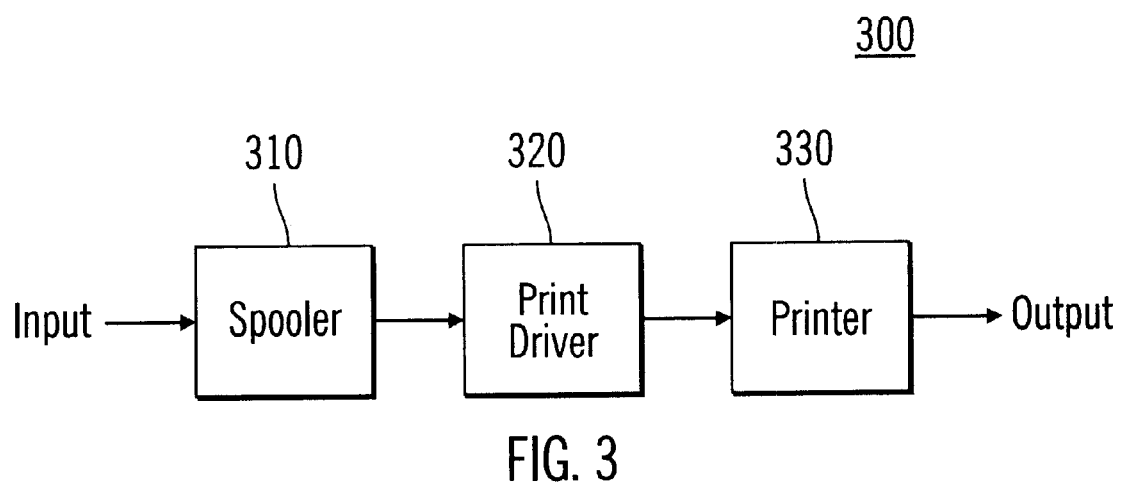
FIG. 3 illustrates a digital printing system in accordance with one embodiment of the present invention.

FIG. 3 illustrates a digital printing system in accordance with one embodiment of the present invention for printing a multiple-page document (e.g., a book, magazine, catalog, or other publication) as a single print job. The digital printing system includes a printer 330, a print driver 320, and a spooler 310.

Spooler 310 is a program that receives the various print jobs (i.e., print files from application programs) and maintains a queue for the printer. Spooler 310 may be integrated into the operating system.

After pages are assembled by a data processing system, the screen image is translated into the printer's language via print driver 320. The printer's language is essentially a set of codes that allow it to perform its functions, such as centering copy, changing type size, advancing paper, etc. Although print driver 320 converts data from the application program into a form the printer can understand, it is not part of the application, but is often integrated into the operating system.

Printer 330 typically includes (1) an interpreter, which converts the driver data from the data processing system into coding of the printer; (2) the raster image processor (RIP), which organizes font data and creates the page bit map; and (3) the marking engine which actually produces an output image using dots or spots.

Figure 4:
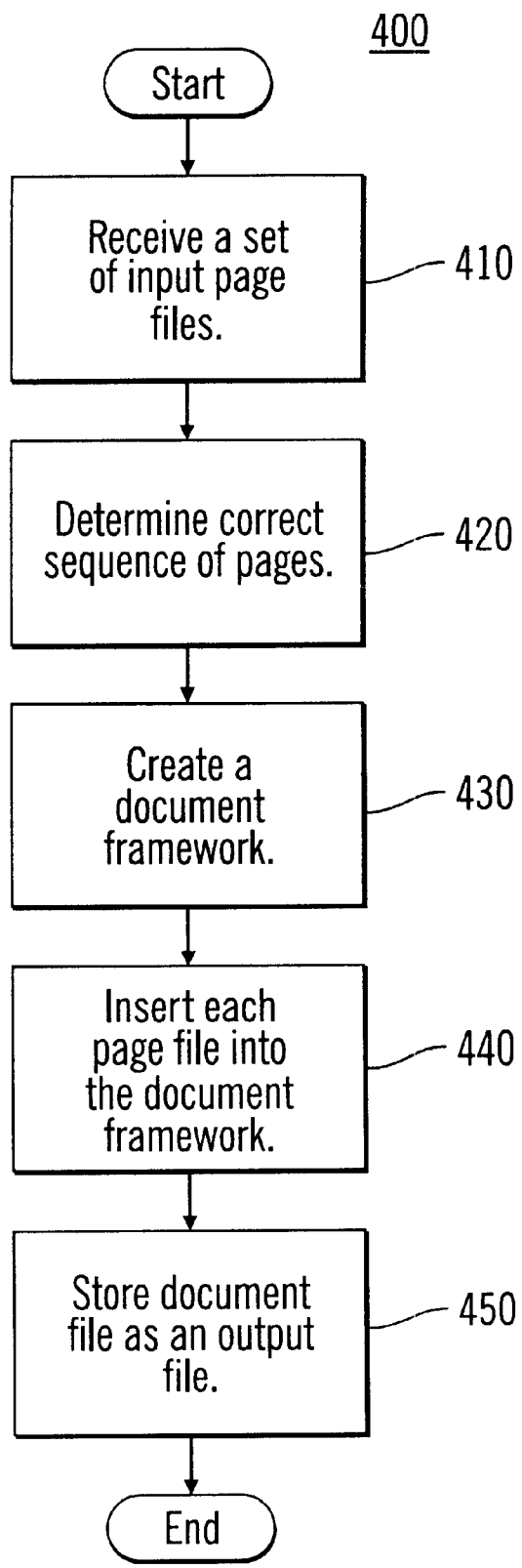
FIG. 4 illustrates a flow chart describing the steps of assembling a collection of files into a single file in accordance with one embodiment of the present invention.

FIG. 4 illustrates a flowchart for assembling a set of page files into a document file. For one embodiment of the present invention, the set of page files are typically files written in a page description language (PDL). For alternative embodiments of the present invention, the set of page files are written in a programming language other than a PDL. In general, a PDL refers to a computer language that is designed for describing how type and graphic elements should be produced by output devices such as printers. The document file generally refers to a digital book, catalog, pamphlet, magazine, or any other publication having multiple pages that need to be combined.

According to FIG. 4, the method of assembling a set of page files into a document starts with receiving a set of input files (i.e., page files) to be assembled. As stated above, each page file may contain the information for printing a single page or group of pages. For one embodiment of the present invention, the set of page files represent a set of PostScript files. PostScript is a page description language (PDL) developed by Adobe Systems, Inc. that can be used to specify the contents of a page that is to be printed. Each PostScript file is a purely text-based description of a page which uses the ASCII character set and which can be generated on every widely used operating system. The biggest advantage of PostScript is device independence. Graphics are defined not according to the characteristics of a particular device (i.e., page size, color depth, resolution, etc.) but independently. In other words, it is possible to output a PostScript file with more or less identical results on various machines, that is, the only visible difference is the increasing reproduction quality as the resolution increases. Virtually every application program running in every desktop computer outputs PostScript and virtually every printer of every type accept PostScript-coded files. For alternative embodiments, the input page files to be assembled may be written in some other PDL.

Once the set of page files is received, the next step 420, is to determine the correct sequence of the pages within the multiple-page document file. The correct sequence of the pages can be determined by various methods. For example, the correct sequence can be determined by performing an alphanumeric sort of the file names of the input page files; by checking the contents of each input page file; or by the explicit enumeration of input page files provided as additional input.

Next, a document framework for the document file, which is capable of holding the set of page files, is created in step 430. For example, if the document provided by this method is to be a single PostScript file, then the document framework is defined using the PostScript programming language.

In step 440, each input page is inserted into the document framework. Step 440 may require adding page constructs and removing document constructs. Note that each input page file typically represents a single page or a group of pages (either simplex or duplex) and needs to be modified to fit into a document framework, which includes all pages within the set of page files. Step 440 may include the option of inserting blank pages into the document framework. Note that the term blank page may refer to a page that is blank because it does not contain any content, or a page that is intentionally left blank but includes some content (e.g., the may have the words "intentionally left blank" printed on it), or due to a page break between sections or chapters in the book. Step 440 will be described in further detail in accordance with FIG. 5.

Once all the pages have been inserted or merged into the document framework, the document file which represents the digital book, is stored as an output file. For one embodiment of the present invention, the output file is a PostScript file. The output file may be sent to a printer or other output device as a single job to be printed, or stored on various types of removable storage media such as a cd-rom or floppy disk, etc. which allows the output file to be retrieved for use at a later time.

One advantage of storing the entire digital book as a single multiple page document file is that entire books or publications may be printed on demand (as a single job) without the need to handle multiple print files (or jobs). The reproduction of multiple page document using multiple print jobs often require manual collating or assembling. Furthermore, offset printing processes require additional manual operations to prepare the press plates. The present invention may be used to eliminate the manual labor involved in inserting blank pages and plate creation, and to provide a cost effective solution for low volume reproductions of books and other publications.

Figure 5:
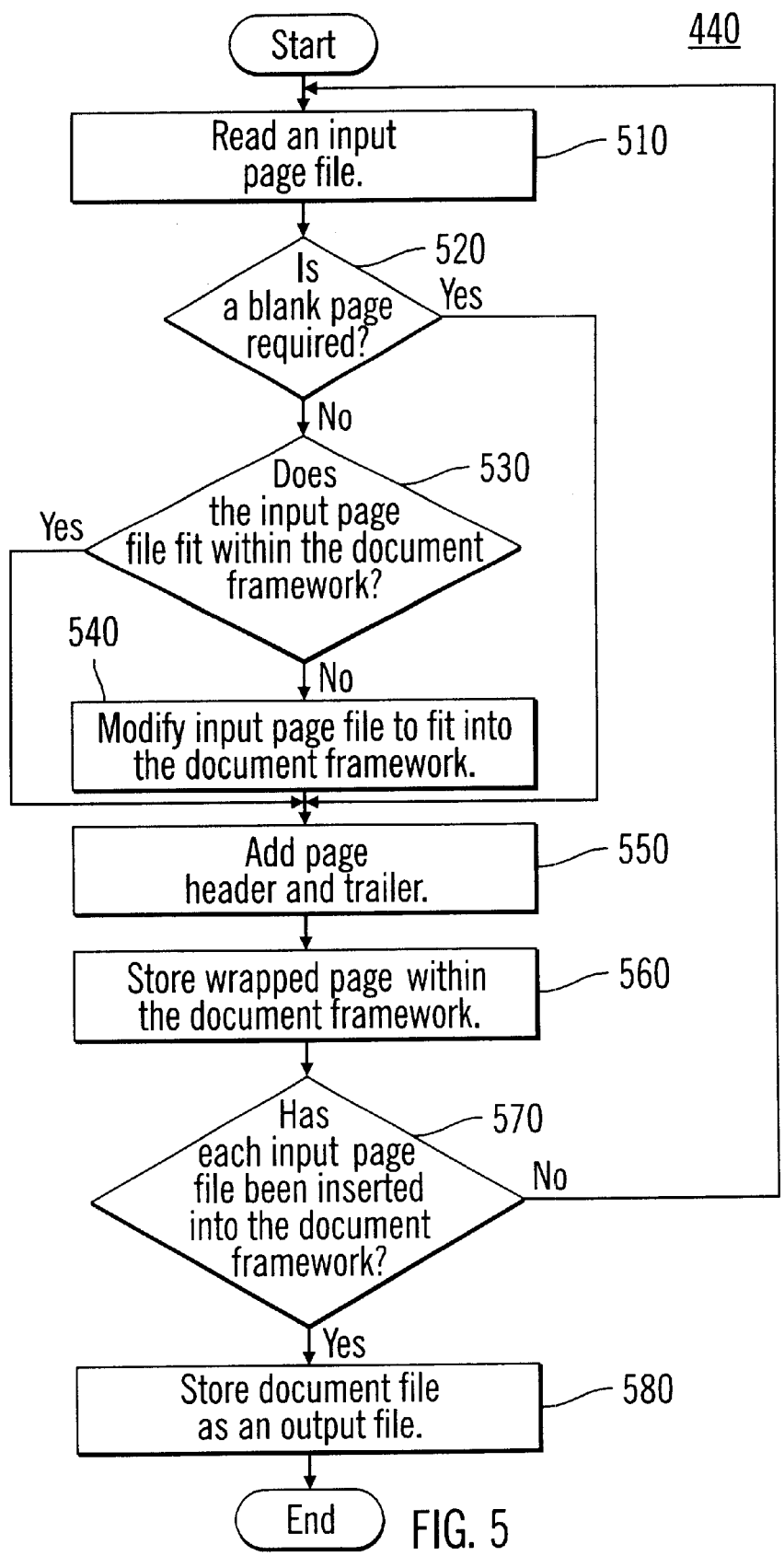
FIG. 5 illustrates a flow chart describing a method of inserting each page file into the document framework in accordance with one embodiment of the present invention.

FIG. 5 describes the steps for inserting each page file into the document framework in accordance with one embodiment of the present invention. The set of input page files are received in step 410. As stated above, each page file may represent a single page or a group of pages. Thus, the input page files must be modified to fit into its new environment, that is, a document framework which includes all pages within the collection of page files.

In step 510, a first input page file is read or viewed. Typically, the first input page file represents the first page (or first group of pages) in the page sequence. (Note that the correct sequence of page was determined in step 420).

Next, in step 520, a determination is made whether a blank page is required. For one embodiment, this determination may be made by checking the even/odd parity of the pages. For example, if page 5 is followed by page 7, then a blank page needs to be inserted after page 5 and before page 7.

If a blank page is necessary, then the flowchart proceeds to step 550. If a blank page is not required, then the flowchart proceeds to step 530. Note that for alternative embodiments, the insertion of blank pages may not be required and therefore step 520 may be eliminated from the flowchart.

Step 530 determines whether or not the input page file fits within the document framework. If it does, then the flowchart proceeds to step 550, otherwise, the flowchart proceeds to step 540.

At step 540, the input page is modified (i.e., by modifying the page data) to fit into the document framework. In performing this step, the current page environment is typically saved such that each input page can only affect its own environment, and not the environment of the other pages, or other parts of the document. Page independence is preserved by "wrapping" each page in a shielded environment. Generally, when a page is wrapped, lines are inserted before and after the page body. Note that this is a characteristic of PostScript.

Step 540 may require that inappropriate document constructs be removed from the input file. For example, the "EOF" construct is not required in the new document context of the input page. Another example, is that the page constructs may be modified to reflect a new document context: a 6×9 inch page may have been printed on 8.5×11 paper as part of an offset printing process, but needs to be centered on a true 6×9 sheet in a digital book. Furthermore, new lines may need to be added to the page context. Additionally, "bleed marks" and other page modifications may need to be added.

Once the input page has been modified to fit into the document framework, in step 550 a page header and trailer is added to the modified page to reflect that it is now a page within a document. This wrapped page is now stored within the document framework as shown in step 560.

Next, in step 570, a determination is made as to whether all of the input pages have been inserted into the document framework. If not, the flowchart returns to step 510 to read or view the next input page file. Once the last input page file has been inserted into the document framework, the document, which now represents the contents of the entire digital book in a single document file, is saved and stored as the output file as shown in Step 580. The output file may then be sent or provided to a printer or other output device to reproduce the entire book (or publication) as a single job.

The present invention of assembling a set of input files into a single output file may be provided as a computer program product which may include a machine readable medium having stored thereon instructions which can be used to program a computer (or other electronic devices) to perform a process according to the present invention. The machine readable medium may include, but is not limited to, floppy disks, optical disks, cd-ROMs, magnetooptical disks, ROMS, RAMs, EPROMS, EEPROMs, magnetic or optical cards, or any type of media/machine readable medium suitable for storing electronic instructions.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A computer implemented method of assembling pages into a multi-page document comprising:
    (a) receiving a plurality of page files, wherein each page file includes one or more pages, wherein each page comprises output for one page of the multi-page document, and wherein at least one page file includes output for multiple pages of a multi-page document;
    (b) determining a sequence of all the pages in all the received page files within the multi-page document;
    (c) creating a framework for a document file for storing the pages from the page files as the multi-page document;
    (d) modifying the pages in the page files to fit into the framework of the document file;
    (e) storing each of the pages from all the received page files within the document file according to the determined sequence; and
    (f) storing the document file, wherein the stored document file can be subsequently retrieved to enable access to the pages in the multiple-page document.

2. The method of claim 1, wherein one or more of the page files is written in a page description language.

3. The method of claim 1, wherein the document file is written in a page description language.

4. The method of claim 1, further comprising, prior to step (e), the step of:
    (g) creating one or more blank pages within the document framework.

5. The method of claim 4, further comprising:
  checking for odd/even page parity to determine if a blank page is required, wherein the blank page is created if required;
  storing the blank page in the document file at a location within the document file to maintain odd/even page parity.

6. The method of claim 1, further comprising the step of:
  (g) providing the document file to an output device.

7. The method of claim 1, wherein step (d) comprises the step of:
  (i) removing document constructs in one or more of the page files that do not define the page file as being a page within the document framework.

8. The method of claim 1, wherein step (d) comprises the step of:
  (i) adding document constructs in one or more of the page files that are necessary to define the page file as being a page within the document framework.

9. The method of claim 1, further comprising:
  wrapping one or more pages with a header and a trailer so that pages will not affect other pages in the document framework.

10. The method of claim 1, further comprising, prior to step (e), the step of:
  (g) creating one or more blank pages within the document framework.

11. The machine-readable medium of claim 10, further comprising:
  checking for odd/even page parity to determine if a blank page is required, wherein the blank page is created if required;
  storing the blank page in the document file at a location within the document file to maintain odd/even page parity.

12. The method of claim 1, where determining the sequence of all the pages in the received page files further comprises sorting the pages files according to their file names.

13. The method of claim 1, wherein determining the sequence of all the pages in the received page files further comprises determining the sequence from content within each page file.

14. A system for assembling pages into a multi-page document, comprising:
  means for receiving a plurality of page files, wherein each page file includes one or more pages, wherein each page comprises output for one page of the multi-page document, and wherein at least one page file includes output for multiple pages of a multi-page document;
  means for determining a sequence of all the pages in all the received page files within the multi-page document;
  means for creating a framework for a document file for storing the pages from the page files as the multi-page document;
  means for modifying the pages in the page files to fit into the framework of the document file.
  means for storing each of the pages from all of the received page files within the document file according to the determined sequence;and
  means for storing the document file, wherein the stored document file can be subsequently retrieved to enable access to the pages in the multiple-page document.

15. The system of claim 14, wherein one or more of the page files is written in a page description language.

16. The system of claim 14, wherein the document file is written in a page description language.

17. The system of claim 14, further comprising means for creating one or more blank pages within the document framework.

18. The system of claim 14, further comprising means for removing document constructs from one or more of the page files that do not define the page file as being a page within the document framework.

19. The system of claim 14 further comprising means for adding document constructs to one or more of the page files that are necessary to define the page file as being a page within the document framework.

20. The system of claim 14, where the means for determining the sequence of all the pages in the received page files further performs sorting the pages files according to their file names.

21. The system of claim 14, wherein the means for determining the sequence of all the pages in the received page files further performs determining the sequence from content within each page file.

22. A machine readable medium having stored thereon data representing a sequence of instructions for assembling pages into a multi-page document, the sequence of instructions, which, when executed by a processor, cause the processor to perform:
  (a) receiving a plurality of page files, wherein each page file includes one or more pages, wherein each page comprises output for one page of the multi-page document, and wherein at least one page file includes output for multiple pages of a multi-page document;
  (b) determining a sequence of all tie pages in all the received page files within the multi-page document;
  (c) creating a framework for a document file for storing the pages from the page files as the multi-page document;
  (d) modifying the pages in the page files to fit into the framework of the document file;
  (e) storing each of the pages from all the received page files within the document file according to the determined sequence; and
  (f) storing the document file, wherein the stored document file can be subsequently retrieved to enable access to the pages in the multiple-page document.

23. The machine-readable medium of claim 22, wherein each of the page files is written in a page description language.

24. The machine-readable medium of claim 22, wherein the document file is written in a page description language.

25. The machine-readable medium of claim 22, further comprising the step of:
  (g) providing the document file to an output device.

26. The machine-readable medium of claim 22, wherein step (d) comprises the step of:
  (i) removing document constructs in one or more of the page files that do not define the page file as being a page within the document framework.

27. The machine-readable medium of claim 22, wherein step (d) comprises the step of:
  (i) adding document constructs in one or more of the page files that are necessary to define the page file as being a page within the document framework.

28. The machine-readable medium of claim 22, further comprising:
  wrapping one or more pages with a header and a trailer so that pages will not affect other pages in the document framework.

29. The machine readable medium of claim 22, where determining the sequence of all the pages in the received page files further comprises sorting the pages files according to their file names.

30. The machine readable medium of claim 22, wherein determining the sequence of all the pages in the received page files further comprises determining the sequence from content within each page file.

* * * * *

UNITED STATES PATENT AND TRADEMARK OFFICE
CERTIFICATE OF CORRECTION

PATENT NO. : 6,480,866 B2 Page 1 of 1
DATED : November 12, 2002
INVENTOR(S) : Scott D. Mastie It is certified that error appears in the above-identified patent and that said Letters Patent is hereby corrected as shown below:

Column 9,
Line 59, delete "." and insert -- ; --

Signed and Sealed this

Ninth Day of August, 2005

JON W. DUDAS
*Director of the United States Patent and Trademark Office*